J. M. HOWARTH.
POTATO PEELER.
APPLICATION FILED OCT. 30, 1917.
1,263,672.
Patented Apr. 23, 1918.
2 SHEETS—SHEET 1.
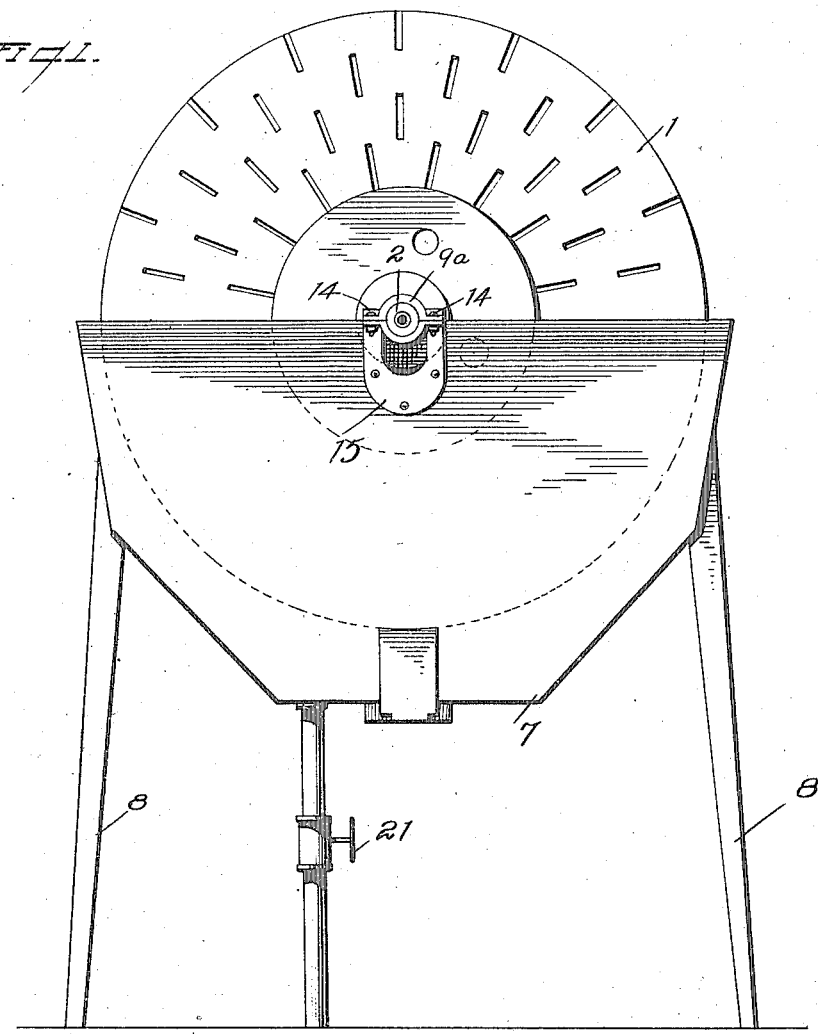
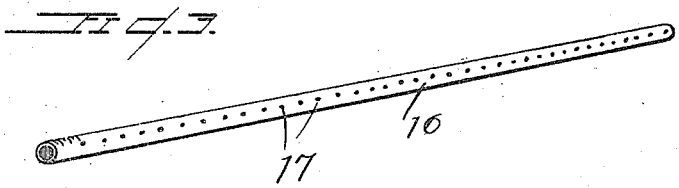
Witness
George G. Myers.
Inventor
John M. Howarth,
By [signature]
Attorney

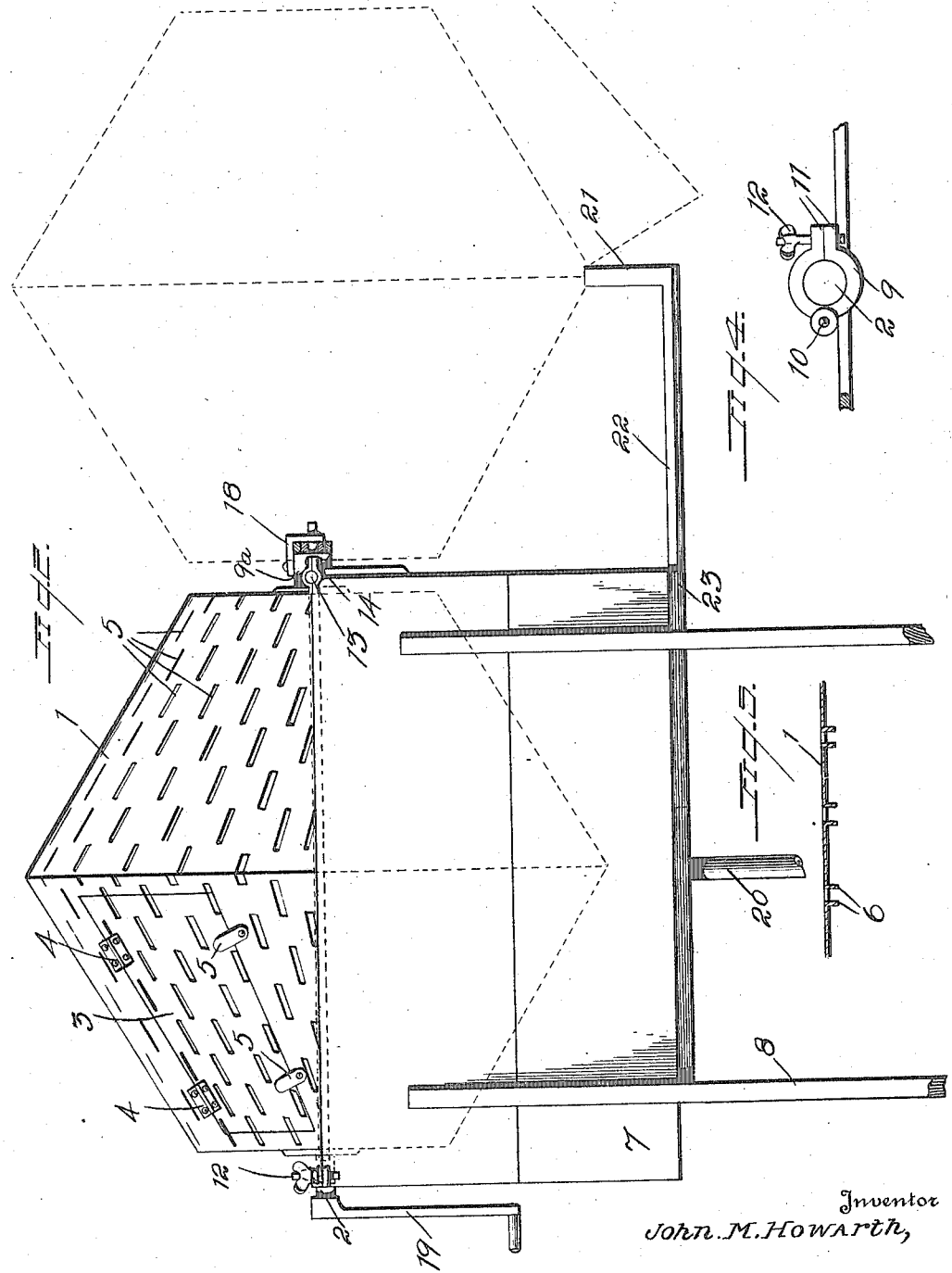

UNITED STATES PATENT OFFICE.

JOHN M. HOWARTH, OF WAUSAU, WISCONSIN.

POTATO-PEELER.

1,263,672.  Specification of Letters Patent.  Patented Apr. 23, 1918.

Application filed October 30, 1917. Serial No. 199,327.

*To all whom it may concern:*

Be it known that I, JOHN M. HOWARTH, a citizen of the United States, and a resident of Wausau, in the county of Marathon and State of Wisconsin, have invented certain new and useful Improvements in Potato-Peelers, of which the following is a specification.

My invention is an improvement in potato peelers, and has for its object to provide a device of the character specified, wherein a rotating container is provided, into which the potatoes to be peeled are adapted to be placed, the said container having peeling means for shredding the peeling from the potatoes, and with which the potatoes are thrown into contact as the casing is rotated, the casing having means for spraying the potatoes as they are peeled to remove the peelings and to clean the peeled potatoes.

In the drawings:

Figure 1 is an end view of the improved peeler;

Fig. 2 is a side view;

Fig. 3 is a perspective view of the spray pipe;

Fig. 4 is an end view of the detachable bearing;

Fig. 5 is a partial section through the container wall.

In the present embodiment of the invention, the container 1 is a casing, cylindrical in cross section, of greatest diameter at its center and gradually decreasing in diameter toward its ends, and each end is provided with a hollow journal pin 2, the said pins being in alinement.

A door opening is provided, in the casing, and a door 3 is hinged to the casing, as indicated at 4, for closing the opening, the casing having latches 5 for holding the door in closed position. The peripheral surface of the casing is provided with a series of slots, the said slots being formed by slitting the wall of the casing in H-shape and turning the portions between the slits inward to form cutting blades 6, as shown more particularly in Fig. 5. These slots are arranged in series, and the members of each series are staggered with respect to the members of the adjacent series, so that from end to end of the casing there is a continuous line of blades, and a potato rolling on the inner surface of the casing must come into contact with the cutting blades during its travel.

The journal pins 2 are journaled in bearings to be later described in a trough shaped receptacle 7, the said receptacle having supporting legs 8. These bearings 9 and 9ª are at the ends of the trough and the bearing 9 is sectional, consisting of a lower fixed section and an upper movable section which is hinged to the lower section, as indicated at 10. The sections have lapping radial lugs 11, and a thumb nut 12 is provided for connecting the lugs. By releasing the thumb nut the upper section of the bearing may be swung upwardly and backwardly on its hinge connection to release the journal pin 2.

The bearing 9ª has outwardly extending trunnions 13 which are received in sectional bearings 14 on a yoke shaped member 15 secured to the adjacent end of the trough. The end of the trough is cut away between the arms of the yoke, so that no impediment is offered to the swinging of the bearing 2.

A pipe 16 is held in the hollow journal pins at the axis of the casing 1, and the said pipe has a longitudinally extending series of openings 17 for permitting the escape of water. One end of the pipe extends beyond the bearing 9ª and beyond the outer end of the journal pin, and is adapted for connection with a hose (not shown) to supply water to the same. A clamp 18 is provided on the bearing 9ª for engaging the pipe to prevent it from turning with the casing, and the journal pin 2 adjacent to the bearing 9 is adapted to receive a crank 19 to turn the casing.

The trough 7 has a pipe 20 extending from the bottom thereof to a sewer connection, for permitting the water to waste away, and a valve 21 is provided for controlling the flow through the pipe. A plate 22 is slidably connected with the bottom of the trough, moving between guides 23 on the said bottom, and the outer end of the plate has an upstanding portion 24.

In operation, the potatoes to be peeled are inserted into the casing 1 through the door 3, and the door is closed. When now the casing is rotated the potatoes will be thrown into contact with the blade 6, which will shred away the peel, and this broken peel will be washed away by the water from the spray pipe to the sewer connection.

After the potatoes have been peeled, the sections of the bearing 9 are released from each other, and the casing is swung from the dotted line position of Fig. 2, the slide 22—24 being pulled out to engage the casing. This slide is of a length to permit the upstanding portion 24 to engage the casing at its greatest diameter, and when the door 3 is opened, it being understood that the door is turned upwardly before the casing is swung, the peeled potatoes will be discharged into a suitable receptacle.

I claim:

A potato peeler comprising a casing having hollow journal pins at its ends, a spray pipe held in the pins and extending beyond the casing at one end, said end being adapted for connection with a hose to supply water to the pipe, a support for the casing having bearings for the journal pins, the bearing at the end of the casing remote from the extended end of the spray pipe being sectional to permit the attachment of the pin and the other being hinged to the support to permit the casing to be swung away from the support into reverse position, said hinge connection comprising a yoke consisting of a body secured to the support, and arms extending above the body and spaced apart to hinge to the bearing and being of a length to permit the spray pipe to pass between the arms without engaging the yoke, for the purpose specified.

JOHN M. HOWARTH.

Copies of this patent may be obtained for five cents each, by addressing the "Commissioner of Patents, Washington, D. C."